United States Patent [19]
Blank et al.

[11] 4,151,143
[45] Apr. 24, 1979

[54] SURFACTANT-FREE POLYMER EMULSION COATING COMPOSITION AND METHOD FOR PREPARING SAME

[75] Inventors: Werner J. Blank, Wilton; Ralph E. Layman, Stamford, both of Conn.

[73] Assignee: American Cyanamid Company, Stamford, Conn.

[21] Appl. No.: 826,207

[22] Filed: Aug. 19, 1977

[51] Int. Cl.$^2$ .............................................. C08L 33/02
[52] U.S. Cl. ................... 260/29.6 RW; 260/29.6 WB
[58] Field of Search ............. 260/29.6 RW, 29.6 WB

[56] References Cited

U.S. PATENT DOCUMENTS

| | | | |
|---|---|---|---|
| 2,906,724 | 9/1959 | Daniel, Jr. | 260/29.4 UA |
| 2,987,493 | 6/1961 | Grady et al. | 260/29.6 RW |
| 3,218,280 | 11/1965 | Koral et al. | 260/29.4 UA |
| 3,313,755 | 4/1967 | O'Rourke | 260/29.6 RW |
| 3,396,135 | 8/1968 | Bishop | 260/29.6 RW |
| 3,457,324 | 7/1969 | Sekmakas | 260/834 |
| 3,821,145 | 6/1974 | Walus | 260/29.4 UA |
| 3,880,793 | 4/1975 | Nakayama | 260/29.6 RW |
| 3,993,612 | 11/1976 | Aihara et al. | 260/29.6 RW |
| 4,064,087 | 12/1977 | Das | 260/29.6 WB |
| 4,073,758 | 2/1978 | Nakayama et al. | 260/29.6 RW |

Primary Examiner—Maurice J. Welsh
Attorney, Agent, or Firm—John L. Sullivan; Bruce F. Jacobs

[57] ABSTRACT

Surfactant-free emulsion coating compositions of superior film-forming properties are produced by a two-stage method comprising, in a first stage, forming a mixture of polymerizable monomers comprises of defined proportions of a carboxylic acid monomer, such as acrylic acid, and a $C_1$-$C_8$ alkyl acrylate or methacrylate, polymerizaing said mixture, neutralizing the polymer product with a sufficient amount of an amine or base to make it water-dispersible and forming an emulsion of the polymer with water, then, in a second stage, forming a mixture of polymerizable monomers comprised of defined proportions of a $C_1$-$C_8$ alkyl acrylate or methacrylate and adding this monomer mixture and a polymerization catalyst to the emulsion produced in said first stage and heating the mixture thus formed to effect polymerization and produce the emulsion coating composition. The method produces an emulsion comprised of polymers of higher molecular weight than producible by conventional emulsion coating forming means and without the use of a surfactant as done conventionally.

10 Claims, No Drawings

SURFACTANT-FREE POLYMER EMULSION COATING COMPOSITION AND METHOD FOR PREPARING SAME

This invention relates to coating compositions. More particularly, it relates to novel surfactant-free polymer emulsions having highly superior properties for use as film coatings for metal and glass surfaces and to a method for preparing these emulsions.

In view of the increasing strictness of anti-air pollution laws, the art is turning more and more from organic solvent-based coating systems to water-based systems. These water-based coatings are made by polymerization of a monomer mix which contains some carboxyl group-carrying monomer, or by polycondensation of mono-, di- or polybasic acids with polyols to form an acrylic, polyester or alkyd resin. These polymers are water-soluble or dispersible in the presence of an amine and an organic cosolvent. From the application standpoint, these water-based compositions are easy to apply, similar to solvent based coatings, and give uniform, water-free films of high gloss. Amino resin-type cross-linking agents, such as hexamethoxymethyl melamine, are used to achieve water-resistant films after baking.

Most amino resins react primarily with the reactive hydroxyl and amide groups of the polymers so that after curing the films formed from these water-soluble compositions contain some unreacted carboxyl groups. Also, the water-soluble acrylic polymers used in coatings are of relatively low average molecular weights, i.e. from about 3,000 up to about 50,000. Also, to achieve reasonable resistance and hardness properties in the cured films, high levels of cross-linking agent have to be used. Still further, to achieve good water solubility (or dispersibility) significant levels of amine and cosolvent have to be used in the coating compositions so that the amount of amine and solvent emitted from the coatings during baking is considerable. Thus, the water-soluble compositions, while having advantages, such as ease of application and uniformity and high gloss in the cured films, are still less flexible than desired and lack some desirable properties such as good water and detergent resistance.

On the other hand, the well-known emulsion-type coating compositions, in which the polymers are of relatively high molecular weight, do not require such large amounts of cross-linking agents as do the water-soluble polymer compositions and so provide cured films of high flexibility and good durability and mechanical resistance properties. However, the emulsion polymer systems present other problems, such as poor wetting of the metal substrate and tendency of the films to crater. Also, because they form a film by the coalescence of the emulsion particles they often give low gloss or a mudcaking effect. The emulsion systems also require a relatively large amount of cosolvent in order to reduce blistering. The main problem with emulsions, however, is the presence therein of surfactants which are required to form a stable emulsion and also to overcome the wetting and adherency problems of the emulsions. Unfortunately, the surfactants remain in the film after cross-linking and adversely affect the water and corrosion resistance of the film as well as the adhesion of the coating to the metal surface.

While, therefore, both the water-soluble coating systems and the emulsion systems have certain advantages and disadvantages, it is the object of the present invention to provide a coating system having most of the advantages of both the water-soluble and the emulsion systems, but without their disadvantages.

In accordance with the invention, there is provided a unique surfactant-free emulsion coating system formed by a new procedural technique and having a distinctive set of advantageous properties as will be shown hereinafter.

The preparation of the emulsion polymer of the invention is carried out in two stages.

(1) In the first stage there is produced a conventional carboxyl group-containing polymer by a conventional solution or bulk polymerization technique. The polymer is then water-dispersed (or solubilized) by partial or full neutralization thereof with an organic amine or base and application of high shear agitation.

(2) In the second stage, there is added to the dispersion of stage I a blend of partially water-soluble and partially water-insoluble monomers, hereinafter referred to as the stage II monomers, together with a free radical initiator. Upon initiation of the polymerization, the stage II monomers polymerize in the stage I dispersion, which results in grafting and the formation of a very stable emulsion without the presence of any added surfactant. The grafting of the stage II monomers onto the stage I polymer increases the overall molecular weight of the system and also produces an emulsion of excellent mechanical stability. Because the process of the invention requires a water-solubilizing group, such as carboxyl-containing monomer, only in the stage I polymer, the total content of water-solubilizing sites in the stage I and stage II monomers can be decreased. This decrease in carboxyl groups in the total of stage I and stage II monomers permits a significant reduction in the amount of neutralizing amine required. On the other hand, if the stage I and stage II monomers are initially combined (in a single stage polymerization process) to make a solution polymer, the resulting dispersion is either very unstable or no dispersion is formed at all. While not intending to be limited in any way by theoretical considerations, it is believed that in a normal water-borne solution polymer only a portion of the carboxyl groups are on the outside of the polymer particle and only this portion of the particle is able to solubilize the particle in water. Thus, the remainder of the carboxyl groups are buried inside the particle where they are ineffective as water-solubilizing sites. On the other hand, in polymers made by the process of this invention, the stage I monomers which contain the carboxyl groups are concentrated on the surface of the final polymer, whereas the stage II monomers which contain no carboxyl groups and which, therefore, have no, or only an insignificant water-solubilizing effect, are contained in the inside of the polymer particle.

In stage I of the process, a mixture of monomers composed of about 3-15% of at least one polymerizable carboxylic acid or anhydride and at least one other polymerizable monomer is used. Acrylic acid or anhydride and maleic acid or anhydride are preferred as carboxylic acid or anhydride, although other acids or anhydrides may be used, for example, α-methacrylic acid or anhydride and the $C_1$–$C_8$ alkyl half esters of maleic acid, such as the 2-ethylhexyl ester. The other polymerizable monomer may suitably be an acrylic acid ester, such as methyl, ethyl, propyl, butyl, or 2-ethylhexyl acrylates or methacrylates, 2-hydroxyethyl acrylate or methacrylate, 2-hydroxypropyl acrylate or methacrylate and ethylhexyl acrylate. Also, styrene, vinyl toluene or acrylamide may be used along with or instead of the acrylic esters in the monomer mixture.

A wide variety of amines may be used in stage I of the process. Thus, although dimethylethanol amine is generally preferred, other amines such as diethanol amine, diethyl ethanol amine, butyl amine, 2-amino, 2-methyl-1-propanol, tris hydroxymethyl amino methane and morpholine are suitable amines.

The stage II monomer mixture contains no polymerizable acid, but is composed of monomers such as methyl, ethyl, propyl and butyl acrylates or methacrylates, beta-hydroxyethyl and beta-hydroxypropyl acrylate or methacrylate, acrylamide and isobutoxymethyl acrylamide. Also, acrylonitrile and styrene may be used. The preferred monomer mixture, however, is composed of 2-hydroxyethyl acrylate, butyl acrylate, and methyl methacrylate.

Suitable monomer mixtures for use in Stage I and Stage II of the process of the invention are shown in Table I.

TABLE I

| Stage I Mixture | | |
|---|---|---|
| Monomer | Wgt. % Range | Wgt. % Preferred |
| Carboxylic Acid Monomer | 3–15 | 5–10 |
| $C_1$–$C_8$ Alkyl Acrylate and/or $C_1$–$C_8$ Alkyl Methacrylate | 30–97 | 60–90 |
| $C_2$–$C_4$ Hydroxyalkyl Ester of a Carboxylic Acid Monomer and/or Acrylamide or Methacrylamide | 0–25 | 5–15 |
| Styrene | 0–35 | 5–15 |
| Total | 100 | 100 |

| Stage II Mixture | | |
|---|---|---|
| $C_1$–$C_8$ Alkyl Acrylate and/or $C_1$–$C_8$ Alkyl Methacrylate | 40–100 | 60–100 |
| $C_2$–$C_4$ Hydroxyalkyl Ester of a Carboxylic Acid Monomer and/or Acrylamide or Methacrylamide | 0–25 | 1–10 |
| Styrene | 0–35 | 5–10 |
| Total | 100 | 100 |

The proportions of the Stage I and Stage II monomer mixtures suitable for use in the process of the invention are such that either mixture can comprise from about 20 to about 80 weight percent, preferably about 50 weight percent, of the total of the two mixtures.

The present invention is a two-stage method for preparing a surfactant-free emulsion product which comprises, in a first stage, (1) forming a mixture of polymerizable monomers comprising, by weight from about 3 to about 15% of a carboxylic acid or anhydride selected from the group consisting of acrylic, methacrylic and maleic acid and their anhydrides and the $C_1$–$C_8$ alkyl half esters of maleic acid, from about 30 to about 97% of a $C_1$–$C_8$ alkyl acrylate or $C_1$–$C_8$ alkyl methacrylate, from 0 to about 25% of a $C_2$–$C_4$ hydroxy alkyl ester of a carboxylic acid or acrylamide or methacrylamide and from 0 to about 35% styrene, (2) polymerizing said mixture in the presence of a polymerization catalyst, a suitable solvent, and optionally, a molecular weight regulator to form a polymer having an average molecular weight of from about 3000 to about 50,000, (3) neutralizing the polymer with an amine or base to the extent required to make the polymer water-dispersible and (4) forming a dispersion of the polymer in water, and, in a second stage, (5) forming a second mixture of polymerizable monomers comprising, by weight, from about 40 to about 100% of a $C_1$–$C_8$ alkyl acrylate or $C_1$–$C_8$ alkyl methacrylate, from about 0 to about 25% of a $C_2$–$C_4$ hydroxyalkyl ester of a carboxylic acid or acrylamide or methacrylamide and from about 0 to about 35% of styrene, (6) combining said second monomer mixture and a polymerization catalyst with the dispersion produced in step (4), the proportion of the second stage monomer mixture combined being such as to comprise from about 20 to about 80% of the total weight of the first and second stage monomer mixtures, and (7) heating the mixture so formed to effect polymerization and produce the polymer emulsion product.

Preferably, the mixture of polymerizable monomers in said first stage comprises from about 5–10% acrylic acid about 5–15% of 2-hydroxyethyl acrylate and about 35–50% butyl acrylate and about 25–55% methyl methacrylate and the mixture of polymerizable monomers in said second stage comprises about 1–10% of 2-hydroxyethyl acrylate, about 35–50% butyl acrylate and about 25–55% methylmethacrylate.

Alternatively, the mixture of polymerizable monomers in said first stage may comprise about 5–10 acrylic acid, about 35–50% butyl acrylate, about 25–55% methylmethacrylate and about 10–30% styrene and the mixture of polymerizable monomers in said second stage comprises about 5–10% of 2-hydroxyethyl acrylate, about 35–50% butyl acrylate and about 25–55% methyl acrylate. Optionally, the second stage also contains 10–30% styrene.

Also alternatively, the mixture of polymerizable monomers in said first stage comprises about 5–10% acrylic acid, about 35–50% butyl acrylate, about 25–55% methylmethacrylate and about 5–15% acrylamide and the mixture of polymerizable monomers in said second stage comprises about 5–10% 2-hydroxyethyl acrylate, about 35–50% butyl acrylate and about 25–35% methyl acrylate.

A more complete understanding of the invention will be had from the following examples and tests.

EXAMPLE 1

| | Stage I | |
|---|---|---|
| | Components | Amount (gms.) |
| (1) | Acrylic acid | 140 |
| (2) | Butyl acrylate | 820 |
| (3) | Methyl methacrylate | 1040 |
| (4) | n-Dodecyl mercaptan | 25 |
| (5) | Dicumyl peroxide | 40 |
| (6) | Propylene glycol | 90 |
| (7) | 2-ethoxy ethanol | 60 |

The propylene glycol and 2-ethoxy ethanol (components 6 and 7) were charged to a 3 liter 4-necked flask equipped with a stirrer, thermometer, gas inlet tube and reflux condenser. Air in the flask was displaced by nitrogen and the contents heated to reflux temperature (130°–135° C.). Components 1–5 were mixed together, and when the peroxide was completely dissolved the mixture was added at a uniform rate to the 4-necked flask over a 2 hour period during which the temperature gradually rose to 155° C. After holding at this temperature for two hours, the batch was cooled to 100° C. and 2.4% wt. of dimethyl amino ethanol (DMAE) was stirred in to form an amine salt of the polymer. After cooling to 80° C. a 500-gram portion of the reaction mixture was transferred to a steel beaker. With the aid of a high speed stirrer having a blade tip speed of approx. 800 ft./min., 600 gms. of water at 70° C. were added slowly to the mixture, thereby producing a thin milky dispersion having a pH of 7.2, a solids content of 42%, and viscosity of 200 centipoises. Cooling to room temperature was done in a water bath.

Stage II

A monomer mix composed of 7 gms. of 2-hydroxy ethyl acrylate, 41 gms. of butyl acrylate and 53 gms. of methyl methacrylate was sparged with nitrogen and then slowly added to a mixture of 240 gms. of the emulsion prepared in Stage I and 100 gms. of de-airated water in a flask equipped with stirrer, gas inlet tube, thermometer and reflux condenser. A blanket of nitrogen was maintained over the liquid in the flask. The addition of the monomer mix made the mixture thicker than the initial Stage I emulsion. Next, 0.4 gm. of ammonium persulfate (98%) was added to 12 gms. of de-airated water and this mixture was slowly stirred into the reaction mixture in the flask causing some reduction in viscosity. Mild heat was applied to the flask so that the contents were raised to 65° C. in about 1 hour. Thereafter, the contents were held for three additional hours at 65°-70° C. and then cooled to room temperature. The monomers had polymerized almost completely, since analysis showed only 0.2% unreacted monomer. Solids content was 44%, pH 7.1, and viscosity 125 centipoises. There was a negligible amount of coagulum. A 0.003" wet film drawn down on aluminum sheet metal was air-dried and also baked to a clear, hard, glossy film that wetted the metal well and was free of dimples and craters.

The pH of another portion of the copolymer emulsion was raised to about 8 by addition of a 20% solution of dimethyl amino ethanol (DMAE). A commercial grade of hexakismethoxymethyl melamine (HMMM) was then stirred into the emulsion in an amount such that it constituted 15% of the total solids content thereof. Two percent of amine neutralized p-toluene sulfonic acid, based on the HMMM, was then added to catalyze the thermosetting. A 0.003" wet film drawn down on sheet aluminum was baked 1 min. at 500° F. to yield a clear, glossy, hard film. Pencil hardness was F and reverse impact resistance was 40 inch pounds.

EXAMPLE 2

Stage I

The procedure was similar to Example 1, except that the monomer mixture used was 7% acrylic acid, 6% β-hydroxy ethyl acrylate, 41% butyl acrylate and 46% methyl methacrylate. A dispersion in water was made just as in Example 1.

Stage II

A copolymer emulsion using the emulsion polymer of Stage I of Example 2 was prepared similarly to that of Stage II of Example 1 except that the added monomer mixture was composed of 1% β-hydroxyethyl acrylate, 49% butyl acrylate and 50% methyl methacrylate. Final solids was 44%, pH, 7.2 and viscosity, 115 centipoises. The compatability of the stage I and stage II polymers is shown by the fact that when a thin film of this product was air-dried and baked, a clear glossy film was formed. When compounded with HMMM, so as to contain 10% of this amino compound on a solids basis, and catalyzed with p-TSA (p-toluene sulfonic acid), a 0.003" wet film on aluminum baked in 10 minutes at 300° F. to a clear glossy solvent-resistant coating with F pencil hardness and greater than 60 inch pounds reverse impact resistance.

EXAMPLE 3

Stage I

This was 155 gms. of the emulsion of Stage I, Example 2.

Stage II

Here, the monomer mixture (135 gms.) was composed of 7% β-hydroxyethyl acrylate, 46% butyl acrylate and 47% methyl methacrylate. The procedure involved stirring a solution of 2.5 gms. of DMAE in 145 gms. of de-airated water into the emulsion of stage I, then stirring in the mixture of monomers. Finally, 0.4 gms. of ammonium persulfate in 18 grams of water were added dropwise. Mild heating and stirring were then applied until the flask contents reached 50° C. The heat was then removed and the contents held at 50°-55° C. for four hours. After cooling to room temperature the viscosity was 200 centipoises, pH 7.5 and solids 44.1%. A 0.003" wet film on sheet aluminum air dired clear and glossy. When the copolymer emulsion was blended with HMMM to yield 18% of the latter and catalyzed with 0.55% p-TSA (based on the amino resin) a 0.003" wet film on sheet aluminum baked in 20' at 250° F. to a clear, hard, glossy film having reverse impact resistance of >60 inch pounds, F pencil hardness, and resistance to 200 rubs with a methyl ethyl ketone soaked towel.

EXAMPLE 4

Stage I

The procedure here was the same as that for Stage I of Example 1, except that the monomer mixture used was 7% acrylic acid, 30% styrene, 27% methyl methacrylate and 36% butyl acrylate, and the propylene glycol was replaced by ethoxy ethanol.

Stage II

A copolymer emulsion using the emulsion of Stage I above was prepared in a fashion similar to that of Stage II, Example 1, except that the added monomer mixture was 7.5% β-hydroxyethyl acrylate, 27.5% styrene, 28% methyl methacrylate and 37% butyl acrylate, and the pH of the emulsion was adjusted with DMAE to 8.5 at the start of the copolymerization. The finished copolymer emulsion had a viscosity of 140 centipoises, a pH of 7.1 and a solids content of 43.4%. When compounded with HMMM and p-toluene sulfonic acid as in Example 3, this product yielded films on aluminum which baked in 30' at 250° F. to hard, glossy, solvent-resistant coatings.

EXAMPLE 5

Stage I

The following materials were used to prepare a polymer emulsion in the same fashion as in stage I of Example 1: Acrylamide 100 gms., acrylic acid 140 gms., butyl acrylate 820 gms., methyl methacrylate 940 gms., dicumyl peroxide 40 gms., n-dodecyl mercaptan 30 gms., propylene glycol 90 gms. and ethoxy ethanol 120 gms. Half of the ethoxy ethanol was mixed with the monomers to effect solubility of the acrylamide. The resultant polymer was partially neutralized by 2.4% DMAE and then dispersed in water to 40% solids using a high speed mixer.

Stage II

To 250 gms. of the emulsion of Stage I above and 150 gms. de-airated water there was added with good agitation 50 gms. methyl methacrylate, 49 gms. butyl acrylate, 1 gm. of 2-hydroxyethyl acrylate, and 1/2 gm. azobis isobutyronitrile. Under a nitrogen blanket the above was heated with stirring to 75° C., held 10 hrs. and then cooled to room temperature. The pH was 7.4, the viscosity 140 centipoises and the solids content 38.8%. This copolymer emulsion was compounded with 11% of a polymeric partially methylated melamine-formaldehyde resin (80% concentration in water) to yield a clear baking enamel of 42% solids. When cast as a 0.003" thick wet film on sheet aluminum and then baked 20 minutes at 250° F. the cured coating had good gloss, clarity, flow and color, and no crater or dimple defects. Reverse impact was 60 in. lbs., and MEK resistance was in excess of 200 rubs.

The clear baking enamels of the foregoing examples may be pigmented with titanium dioxide to yield white high gloss enamels having utility as coatings for sheet metal, coiled metal, and fabricated metal items.

EXAMPLE 6

Stage I

The following materials were processed in a fashion similar to that of Example 1, Stage I: 10 gms. methacrylic acid, 80 gms. β-hydroxyethyl acrylate, 525 gms. methyl methacrylate, 550 gms. butyl acrylate, 100 gms. styrene, 28 gms. n-dodecyl mercaptan, 28 gms. dicumyl peroxide and 120 gms. ethoxy ethanol. When polymerization was completed, the polymer solution was cooled to 110° C., partially neutralized with 2.5% DMAE and upon cooling to 80° C. was dispersed in water to 42% solids. The pH was 8.1 and the viscosity 435 centipoises, both at 25° C.

Stage II

To 240 gms. of the emulsion of Stage I there was added with good agitation 100 gms. of water and 100 gms. of a monomer mixture composed of 5% hydroxyethyl acrylate, 40% butyl acrylate and 55% methyl methacrylate, by weight. Then, under a nitrogen blanket, 0.4 gms. of ammonium persulfate dissolved in 17 gms. of water was mixed in. Heat was applied and when the flask contents had attained 65° C. the heat was reduced and the batch held at 65° C. for three hrs. After cooling to room temperature, the product was a thin liquid of pH 6.6, having a viscosity of 65 centipoises, and a solids content of 43.5%. The pH was adjusted up to 7.5 using dilute DMAE and then a film was cast on glass. After the film air-dried 30' it was clear, hard and glossy.

EXAMPLE 7

Stage I

An emulsion polymer was made as in Example 1 using maleic anhydride instead of acrylic acid. Thus, the monomer mixture had the following components: maleic anhydride, 100 gms., styrene, 140 gms., butyl acrylate, 560 gms., methyl methacrylate, 600 gms., and dicumyl peroxide, 28 gms. When all the maleic had dissolved, the mixture was added, over a 2 hr. period, to 125 parts of para-cymene at a temperature of 140°–160° C. and the whole held at 160° C. for two hours. After cooling to 140° C., there was added 90 gms. ethoxy ethanol and the mixture held at 150° C. for 1 hour. After being cooled to 80° C., 14 gms. of DMAE were added to a 500 gm. portion of the reaction mixture. Thereafter, the mixture was dispersed in water at 70° C. as was done in Example 1. After cooling to 25° C. the pH was 7.2, the solids content 42%, and the viscosity 140 centipoises.

Stage II

To 240 gms. of the emulsion of Stage I above there was added 140 gms. water and 100 gms. of a monomer mixture composed of 4 gms. 2-hydroxyethyl acrylate, 10 gms. styrene, 31 gms. butyl acrylate and 55 gms. methyl methacrylate. When the monomer was well mixed in, 0.4 gms. ammonium per sulfate dissolved in 26 gms. of water (de-air-ated) was slowly stirred in and the flask contents heated to 65° C., held there for four hours and then cooled to room temperature. The solids was 40%, the viscosity 100 centipoises and the pH 6.8. The latter value was raised to 7.1 by addition of some dilute DMAE. A film was cast, on clear glass, and after air-drying several hours the film was smooth, hard, clear, and glossy. The film was baked 10 minutes at 300° F., cooled to room temperature, and then immersed in water. It did not blister or turn white within a 3 day period.

EXAMPLE 8

Stage I

A monomer blend consisting of 14 parts by weight of 2-hydroxyethyl acrylate, 15.5 parts acrylic acid, 93.5 parts butylacrylate, 108 parts methylmethacrylate, 3.35 parts n-dodecyl mercaptan and 4.45 parts dicumyl peroxide was fed over a 2½ hour period into a mixture of 10 parts 2-ethoxyethanol and 10 parts propylene glycol in a reactor eqipped with a stirrer and reflux condenser. After the monomer addition was complete, the temperature of the reaction mixture was 148° C. and was maintained at that level for an additional hour to insure complete monomer conversion.

The batch was then cooled to 90° C. and 6 parts of dimethylaminoethanol (DMAE) added. Then, under high speed agitation, 290 parts of water were slowly added without permitting the batch temperature to fall below 70° C. The resulting dispersion of the water-soluble resin was of fine particle size, bluish in color and of low viscosity.

Stage II

To the dispersion of Stage I there were added 240 parts of water followed by addition of approximately 70% of a monomer blend consisting of 2.3 parts of hydroxyethyl acrylate, 113 parts of butylacrylate and 117 parts of methylmethacrylate. A solution of 0.93 parts of ammonium persulfate in 30 parts of water was then added followed by addition of the remaining 30% of the monomer blend. Under continuous agitation the reaction temperature was raised to 50° C. The exotherm of the reaction then carried the temperature to 70° C. where it was held for 3 hours and then reduced to room temperature. The resulting 47% solids emulsion was of extremely small particle size and had a viscosity on the Gardner-Holdt scale of D-F.

The total monomer blend (Stage I and Stage II monomers) contained 3.3% acrylic acid, 3.5% hydroxyethylacrylate, 44.6% butylacrylate and 48.6% methylmethacrylate. Gell phase analysis of the stage I polymer dispersion showed an average molecular weight of about 10,000. The final emulsion, resulting from about 50% of the stage I monomers and 50% of the stage II monomers, showed a different molecular weight distribution. Thus, the molecular weight fraction of 10,000 had decreased to about 32%, while about 39% had an average molecular weight of about 500,000 and about 29% had a molecular weight greater than 2,000,000. This reduction in the 10,000 molecular weight fraction from 50% to 32% is a clear indication that a significant amount of grafting of the Stage II monomers onto the polymers formed from the stage I monomers had taken place.

The emulsion prepared above was formulated into a water-reducible coating using hexamethoxymethyl melamine (Formulation A) or a partially methylated melamine formaldehyde (Formulation B) as cross-linking agent. Excellent glossy films were obtained which were uniformly hard and flexible. The pertinent data are shown in Table II. The enamel solids of 56.7% and 59.7% obtained with Formulations A and B, respectively, is very high for a water-borne coating system. Formulation B cures adequately at 250° F. giving an excellent gloss of 94 (60°) and 71 (20°). The use of HMMM as a cross-linking agent (Formulation A) requires a higher baking temperature, but results in a more flexible coating.

Water immersion tests on Formulations A and B at 50° C. show only a slightly softening after 24 hrs. and no loss of adhesion or blistering. After drying at room temperature, the original hardness was restored. Salt spray test on iron phosphated CRS panel and aluminum panels showed a creepage of less than 1 mm. after 240 hours exposure. No visible loss of gloss and blistering was observed.

Table II

| Formulation | A | B |
|---|---|---|
| | Pounds per 100 Gallons | |
| Titanium Dioxide | 258.3 | 279.9 |
| Example 8 Emulsion | 140.0 | 151.6 |
| Dimethyl Ethanolamine | 2.3 | 2.5 |
| Polycarboxylic Acid Wetting Agent | 1.7 | 1.9 |
| Demineralized Water | 57.7 | 62.5 |
| Disperse Above and Add: | | |
| Example 8 Emulsion | 513.7 | 511.9 |
| HMMM | 51.5 | — |
| Partially methylated Melamine-formaldehyde resin | — | 88.4 |
| p-Toluene Sulfonic Acid (40% in isopropanol) | 1.7 | — |
| Dimethyl Ethanolamine | 0.7 | — |
| 2-Butoxyethanol | 7.1 | — |
| Demineralized Water | 35.9 | — |
| Enamel Properties | | |
| Non-Volatile, % by wgt. | 56.7 | 59.7 |
| Non-Volatile, % by vol. | 44.1 | 46.7 |
| Viscosity, Ford 4-Cup, sec. | 17.0 | 25.0 |
| Composition of Binder Solids | | |
| Example 8 Emulsion, % by wgt. | 84.5 | 79.5 |
| CYMEL Resin | 14.8 | 20.0 |
| Polycarboxylic Acid Wetting Agent | 0.5 | 0.5 |
| Catalyst | 0.2 | — |
| Composition of Volatiles, vol. % | | |
| Dimethyl Ethanolamine | 1.24 | 1.12 |
| 2-Butoxyethanol | 3.42 | 1.77 |
| Water | 95.34 | 97.11 |
| Film Properties[1] | | |
| Baked 20 Minutes at 250° F. | | |
| Dry Film Thickness, mils. | — | 1.15 |
| Gloss, 60° | — | 94.0 |
| Gloss, 20° | — | 71.0 |
| Hardness, Knoop, $KHN_{25}$ | — | 8.4 |
| Hardness, Pencil | — | F-H |
| Impact Resistance, Reverse, in./lbs. | — | 10.0 |
| MEK Resistance, Double Rubs | — | 200+ |
| Baked 20 Minutes at 300° F. | | |
| Dry Film Thickness, mils. | 1.15 | 1.1 |
| Gloss, 60° | 92.0 | 92.0 |
| Gloss, 20° | 69.0 | 65.0 |
| Hardness, Knoop, $KHN_{25}$ | 3.5 | 10.1 |
| Hardness, Pencil | HB-F | H-2H |
| Impact Resistance, Reverse, in./lbs. | 40.0 | 10.0 |
| MEK Resistance, Double Rubs | 200.0 | 200+ |
| Baked 20 Minutes at 350° F. | | |
| Dry Film Thickness, mils. | 1.1 | — |
| Gloss, 60° | 92.0 | — |
| Gloss, 20° | 65.0 | — |
| Hardness, Knoop, $KHN_{25}$ | 6.5 | — |
| Hardness, Pencil | F-H | — |
| Impact Resistance, Reverse, in./lbs. | 20.0 | — |
| MEK Resistance, Double Rubs | 200.0 | — |

[1]Films cast on Alodine 1200S treated aluminum test panels.

The emulsion was also formulated into a coil-coating formulation. The pertinent data are shown in Table III.

TABLE III

| Example 8 Emulsion in Coil Coating OR 600 43-L TNV | Pigment = Titanium Dioxide | | |
|---|---|---|---|
| Emulsion/HMMM[1] | 90/10 | 90/10 | 80/20 |
| p-TSA, % | 0.2 | 0.2 | 0.2 |
| Cure (Sec. at 500° F.) | | | |
| Aluminum Panel | 50.0 | 60.0 | 60.0 |
| Film (Mil) | 0.85 | 0.8 | 0.9 |
| Color (Blue) Photovolt, % | 92.5 | 92.5 | 95.5 |
| Gloss 60° | 87.0 | 87.0 | 86.0 |
| Gloss 20° | 57.0 | 57.0 | 56.0 |
| Knoop | 7.0 | 8.3 | 8.4 |
| Pencil | H-2H | H-2H | H-2H |
| Impact (Rev.) | 20.0 | 20.0 | 10.0 |
| T-Bend | T-2 | T-3 | T-3 |
| MEK | 200+ | 200+ | 200+ |
| Overbake (60 sec.) at 500° F. | | | |
| Popping (None on) | 20.0 | 20.0 | 10.0 |
| Frilling (None on) | T-3 | T-4 | T-4 |

[1]hexamethoxymethylmelamine

As shown in Table III, Formulation A was modified with 10% and 20% of HMMM as a cross-linking agent. In a coil-coating application at the 10% HMMM level, the excellent flexibility of T-2 bend is obtained. Even increasing the level of amino resin to 15% produces a T-3 bend. A solution polymer prepared with the same polymer composition as in Example 8 gives a flexibility of less than T-4.

Comparative Example 9

A water-soluble resin was prepared according to the procedure of stage I, Example 8, except that the monomer blend was adjusted to give the closest approximation in composition to the total monomer blend (stage I and II monomers) of Example 8. Thus, all of the monomers were polymerized at once, rather than in two stages. To achieve water-solubility, the acrylic acid content had to be raised to 9%, using 45% butylacrylate and 46% methylmethacrylate as comonomers. The resulting polymer solution in 2-ethoxyethanol had a viscosity of Z-6 on the Gardner-Holdt scale and a solids content of 75%. The average molecular weight of the blend was about 10,000.

A paint was formulated (Formulation C) with this resin similar to that in Example 8 (Formulation A). The cross-linking level of the hexamethoxymethyl melamine had to be raised to 20% to give sufficient cure and hardness to the water reducible polymer. The pertinent data with respect to this coating is given in Table IV.

TABLE IV

| Formulation C - Example 9 | |
|---|---|
| Enamel Properties[1] | |
| Non-volatile, % by wgt. | 45.0 |
| Non-volatile, % by vol. | 32.0 |
| Viscosity, Ford Cup-4, sec. | 69.0 |
| Baked 20 Minutes at 300° F. | |
| Film Thickness, mils. | |
| Gloss, 60° | 86.0 |
| Gloss, 20° | 77.0 |
| Pencil Hardness | 2B-B |
| Knoop Hardness | 3.5 |
| Impact Resistance, | |
| Reverse, in./lbs. | 0-2 |
| MEK Resistance, Double Rubs | 200+ |
| Baked 20 Minutes at 350° F. | |
| Film Thickness, mils. | 1.0 |
| Gloss, 60° | 83.0 |
| Gloss, 20° | 57.0 |
| Pencil Hardness | F-H |
| Knoop Hardness | 7.8 |
| Impact Resistance, | |
| Reverse, in./lbs. | 2.0 |
| MEK Resistance, Double Rubs | 200 |
| Solvent Composition, % | |
| Amine | 4.1 |
| 2-Ethoxyethanol | 11.9 |
| Water | 85.5 |

[1]Films cast on Alodine 1200S treated aluminum test panels.

Compared to Formulation A of Example 8, the water-reducible system of Example 9 contains about 5.3 times more solvent. A formulated coating with the water-soluble resin of Example 9 has significant lower application solids than that of Example 8. To obtain a dry film thickness of 1 mil, a wet film thickness 3.1 mil would have to be applied with the Formulation C using the resin of Example 9 compared to a wet film thickness of 2.2 for the same dry film thickness with the resin from Example 8. The likelyhood of sagging, tear formation in spray applying a formulation on vertical surfaces using the resin of Example 9, is therefore, significantly increased over the same formulation in Example 8. The gloss obtained with Formulation C, Example 9, surprisingly is lower than that of Example 8, with the exception of the 20° gloss at a baking temperature of 20 minutes at 300° F.

The lower application solids in Example 9 (45%) compared to Formulation A of Example 8 (56.7%) also causes increased problems in flash-off.

Applying the water-reducible system of Example 9 under coil-coating conditions on an aluminum substrate (bake 50 sec. at 500° F.) causes considerable blistering without flash-off. With increased flash-off time to 8 minutes, the applied film showed less than T-4 bend flexibility making it unsuitable for coil-coating.

Comparative Example 10

An emulsion polymer was prepared by conventional procedure, i.e. polymerizing the total monomer composition (the monomers of stage I plus the monomers of Stage II) of Example 8 all at once. A surfactant, Aerosol A-102 (a sulfosuccinate), was used at a level of 2.0%. The resulting acrylic emulsion polymer was pigmented and formulated the same as Formulation A, Example 8. Because of the poor wetting characteristics and poor stability of the emulsion, a water-soluble resin of the composition in Example 9 was used as a wetting agent for the pigment.

A film of the emulsion was drawn down on an aluminum substrate. The pertinent data with respect to the film are given in Table V.

TABLE V

| Formulation of Example 10 | |
|---|---|
| Enamel Characteristics[1] | |
| Non-volatile, % by wgt. | 55.0 |
| Non-volatile, % by vol. | 43.0 |
| Viscosity, Ford Cup-4, sec. | 20.0 |
| Baked 20 min. at 300° F. | |
| Film Thickness, mils. | 1.0 |
| Gloss, 60° | 65.0 |
| Gloss, 20° | 35.0 |
| Knoop Hardness | 4.0 |
| Pencil Hardness | HB-F |
| Impact Resistance, reverse | 40.0 |
| MEK Resistance, double rubs | 200.0 |
| Coil-Coating Application (50 sec. at 500° F.) | |
| T-bend | T-2 |
| Pencil Hardness | F-H |
| Solvent Composition | |
| Water | 98.0 |
| Amine | 1.0 |
| Glycol Ether | 1.0 |

[1]Film cast on Alodine 1200S treated aluminum test panels

Compared to Formulation A of Example 8, this conventional emulsion gives poor gloss. Wetting of the substrate is also bad and the applied film has a tendency to pinhole and crater.

As shown in Table VI, the film of the Formulation A, Example 8, emulsion (no surfactant) is also clearly superior in water resistance to the film of Example 10 containing a conventional surfactant and is also superior to the surfactant-free polymer of Example 9 which contains higher levels of cross-linking agent.

Table IV

| Pencil | Water Immersion (24 hrs. at 50° C.) | | |
|---|---|---|---|
| Hardness | Example 8 (A) | Example 9 | Example 10 |
| Initial | F-H | F-H | H-2H |
| After Immersion | HB-F | B-HB | 5B-4B* |

*loss of adhesion

The addition of the surfactant used in Example 10 to the emulsion Formulation A of Example 8 produces similar softening and adhesion problems on water immersion to those shown for Example 10.

Draw down of the formulation of Example 10 on steel causes yellow staining and flash rusting whereas the systems of Examples 8 and 9 show no such effect.

It will be appreciated from the foregoing that the emulsions of the present invention, which contain no added surfactant, exhibit superior film-forming properties to polymer emulsions produced by conventional emulsion polymerization procedures using a regular surfactant. Thus, pigmentation of the emulsions is very easy since direct addition of the pigment can be used and the pigment ground in the emulsion.

The emulsions show very good wetting of poorly cleaned metal surfaces with no creeping or pinholing occurring in the applied film. Also, the films made with the emulsions of the invention are of high gloss and give no mudcracking.

Finally, the films provided by the emulsions exhibit excellent moisture resistance showing only a very small loss of hardness and no loss of adhesion in the water immersion test.

We claim:

1. A two-stage method for preparing a surfactant-free polymer emulsion product which comprises, in a first stage, (1) forming a mixture of polymerizable monomers comprising, by weight from about 3 to about 15% of a carboxylic acid or anhydride selected from the group consisting of acrylic, methacrylic and maleic acid and their anhydrides and the $C_1$–$C_8$ alkyl half esters of maleic acid, from about 30 to about 97% of a $C_1$–$C_8$ alkyl acrylate or $C_1$–$C_8$ alkyl methacrylate, from 0 to about 25% of a $C_2$–$C_4$ hydroxy alkyl ester of a carboxylic acid or acrylamide or methacrylamide and from 0 to about 35% styrene, (2) polymerizing said mixture in the presence of a polymerization catalyst, a suitable solvent, and optionally a molecular weight regulator to form a polymer having an average molecular weight of from about 3000 to about 50,000, (3) neutralizing the polymer with an amine or base to the extent required to make the polymer water-dispersible and (4) forming a dispersion of the polymer in water, and, in a second stage, (5) forming a second mixture of polymerizable monomers comprising, by weight, from about 40 to about 100% of a $C_1$–$C_8$ alkyl acrylate or $C_1$–$C_8$ alkyl methacrylate, from about 0 to about 25% of a $C_2$–$C_4$ hydroxyalkyl ester of a carboxylic acid or acrylamide or methacrylamide and from about 0 to about 35% of styrene, (6) combining said second monomer mixture and a polymerization catalyst with the dispersion produced in step (4), the proportion of the second stage monomer mixture combined being such as to comprise from about 20 to about 80% of the total weight of the first and second stage monomer mixtures, and (7) heating the mixture so formed to effect polymerization and produce the polymer emulsion product.

2. The method of claim 1 wherein the mixture of polymerizable monomers in said first stage comprises from about 5–10% acrylic acid, about 5–15% of 2-hydroxyethyl acrylate and about 35–50% butyl acrylate and about 25–55% methyl methacrylate and wherein the mixture of polymerizable monomers in said second stage comprises about 1–10% of 2-hydroxyethyl acrylate, about 35–50% butyl acrylate and about 25–55% methylmethacrylate.

3. The method of claim 1 wherein the mixture of polymerizable monomers in said first stage comprises about 5–10% acrylic acid, about 35–50% butyl acrylate, about 25–55% methylmethacrylate and about 10–30% styrene and wherein the mixture of polymerizable monomers in said second stage comprises about 5–10% of 2-hydroxyethyl acrylate, about 35–50% butyl acrylate and about 25–55% methyl acrylate.

4. The method of claim 3 wherein the mixture of polymerizable monomers in said second stage also contains 10–30% styrene.

5. The method of claim 1 wherein the mixture of polymerizable monomers in said first stage comprises about 5–10% acrylic acid, about 35–50% butyl acrylate, about 25–55% methylmethacrylate and about 5–15% acrylamide and wherein the mixture of polymerizable monomers in said second stage comprises about 5–10% 2-hydroxyethyl acrylate, about 35–50% butyl acrylate and about 25–35% methyl acrylate.

6. A polymer emulsion made by the process of claim 1.

7. A polymer emulsion made by the process of claim 2.

8. A polymer emulsion made by the process of claim 3.

9. A polymer emulsion made by the process of claim 4.

10. A polymer emulsion made by the process of claim 5.

* * * * *